US011035432B2

(12) United States Patent
Pegoraro

(10) Patent No.: US 11,035,432 B2
(45) Date of Patent: Jun. 15, 2021

(54) VIBRATION DAMPER

(71) Applicant: KTM AG, Mattighofen (AT)

(72) Inventor: Roberto Pegoraro, Friedburg (AT)

(73) Assignee: KTM AG, Mattighofen (AT)

( * ) Notice: Subject to any disclaimer, the term of this patent is extended or adjusted under 35 U.S.C. 154(b) by 81 days.

(21) Appl. No.: 16/442,896

(22) Filed: Jun. 17, 2019

(65) Prior Publication Data
US 2019/0383348 A1    Dec. 19, 2019

(30) Foreign Application Priority Data

Jun. 19, 2018   (DE) .......................... 102018114679.5

(51) Int. Cl.
| | |
|---|---|
| *F16F 9/46* | (2006.01) |
| *F16F 9/34* | (2006.01) |
| *B62K 25/04* | (2006.01) |
| *F16F 9/06* | (2006.01) |

(52) U.S. Cl.
CPC .............. *F16F 9/466* (2013.01); *B62K 25/04* (2013.01); *F16F 9/061* (2013.01); *F16F 9/34* (2013.01); *F16F 9/461* (2013.01); *B62K 2025/048* (2013.01)

(58) Field of Classification Search
CPC .. F16F 9/461; F16F 9/466; F16F 9/469; F16F 9/486; F16F 9/3221
USPC ............................................. 188/266.6, 314
See application file for complete search history.

(56) References Cited

U.S. PATENT DOCUMENTS

| | | | | |
|---|---|---|---|---|
| 4,744,444 A | * | 5/1988 | Gillingham | F16F 9/44 |
| | | | | 137/523 |
| 5,597,054 A | * | 1/1997 | Nagai | F16F 9/46 |
| | | | | 188/266.6 |
| 8,235,187 B2 | | 8/2012 | Murakami | |
| 8,276,719 B2 | | 10/2012 | Trujillo et al. | |
| 2004/0211633 A1 | * | 10/2004 | Kajino | F16F 9/3484 |
| | | | | 188/322.15 |

(Continued)

FOREIGN PATENT DOCUMENTS

| | | |
|---|---|---|
| DE | 41 03 356 C1 | 6/1992 |
| DE | 10 2004 014 458 B4 | 11/2007 |

(Continued)

OTHER PUBLICATIONS

Dialog translation JP 2003172394A. (Year: 2003).*

*Primary Examiner* — Thomas J Williams
(74) *Attorney, Agent, or Firm* — Rod D. Baker

(57) ABSTRACT

A vibration damper for use particularly on wheeled vehicles. The damper has a cylinder formed to receive damping fluid and a working piston axially moveable therein, which piston is arranged on a piston rod formed with an axial passage and which divides the inner space of the cylinder into first and second working spaces. The vibration damper has a fluid communication axial passage for a fluid flow from the second working space to the first working space, and has a first adjustment device for adjusting the pressure stage damping and a second adjustment device for adjusting the traction stage damping. The first adjustment device has adjustable valve devices to change throughflow openings for the pressure stage, and the second adjustment device has a setting rod arranged in the axial passage of the piston rod for changing a first throughflow opening of a third valve device for the traction stage.

18 Claims, 9 Drawing Sheets

(56) References Cited

U.S. PATENT DOCUMENTS

| | | | | |
|---|---|---|---|---|
| 2004/0222057 A1* | 11/2004 | Honig | ................... | F16F 9/516 |
| | | | | 188/316 |
| 2013/0105260 A1* | 5/2013 | Chen | ...................... | F16F 9/512 |
| | | | | 188/313 |
| 2014/0116828 A1 | 5/2014 | Noguchi | | |
| 2015/0075930 A1* | 3/2015 | Yablon | .................. | B60G 13/10 |
| | | | | 188/284 |

FOREIGN PATENT DOCUMENTS

| | | | |
|---|---|---|---|
| DE | 10 2006 052 228 B4 | 8/2010 | |
| DE | 10 2014 112 523 A1 | 3/2016 | |
| EP | 1 473 483 B1 | 2/2006 | |
| EP | 2 110 300 B1 | 6/2012 | |
| JP | S59-172688 U | 11/1984 | |
| JP | 3-204422 A * | 9/1991 | ............... F16F 9/44 |
| JP | 2003 172394 A | 6/2003 | |
| JP | 2003172393 A * | 6/2003 | ............... F16F 9/44 |
| JP | 2008 240839 A | 10/2008 | |
| JP | 2015 197128 A | 11/2015 | |
| WO | 2011080795 A1 | 7/2011 | |

\* cited by examiner

VIBRATION DAMPER

BACKGROUND OF THE INVENTION

Field of the Invention

The present invention relates to vibration damper devices, particularly dampers having a cylinder formed for receiving damping fluid and a working piston axially moveable therein. A generic vibration damper can be used to attenuate spring movements on vehicles, for example, motorcycles.

Background Information

A front wheel fork for a motorcycle is known from German Patent Application DE 10-2004-014458, in which a double-pronged shock absorber is used as the shock absorption device. The device has a working cylinder having a working piston, which divides the inner space of the working cylinder into two working spaces.

A similar front wheel fork is known from German Patent Application DE 10-2006-052228, which also uses a double-pronged shock absorber.

A front wheel fork for a motorcycle is also known from European Patent EP 2110300 B1, in which a double-pronged shock absorber is used as the damping device.

A damper for a motorcycle is known from U.S. Pat. No. 8,276,719 B2, in which the working piston is arranged on a piston rod, which is formed to be hollow on the inside. An adjustment rod having an adjustment needle is arranged inside the piston rod, with which adjustment needle the flow of damping fluid from the compression chamber into the rebound chamber can be adjusted both for the pressing movement and the pulling movement. Thus, the damping can be set for both the deflection movement and for the extension movement, but not independently of each other.

A hydraulic shock absorber is known from European Patent EP 1473483, which has a piston rod, which is formed to be hollow on the inside and in which a setting tube and a setting rod are arranged, with which two setting elements can be actuated.

A hydraulically damping vibration damper is known from German Patent DE 4103356 C1, which has a piston rod, which is formed to be hollow on the inside, having a control rod axially shiftable therein. Bores can be covered or released by the control rod, whereby a change of the damping characteristics of the vibration damper is possible.

A hydraulic shock absorber is known from U.S. Pat. No. 8,235,187 B2, which also has a hollow piston rod, in which a setting rod is arranged, on which an adjustment needle can be found to be arranged. The damping characteristics of the damper during the rebound movement can be adjusted via a longitudinal shifting of the adjustment needle. The shifting of the adjustment needle also serves for the adaptation of the damping characteristics during the deflection movement.

Finally, a vibration damper having damping for the traction stage and the pressure stage that can be set independently of each other is known from German Patent Application DE 10-2014-112523.

A further known vibration damper has a cylinder, in which a working piston axially moveable therein is provided, which is arranged in a guiding manner on a piston rod formed with an axial passage and divides the inner space of the cylinder into a first working space for the attenuation of the deflection movement or compression movement, and a second working space for the attenuation of the extension movement or rebound movement.

The piston rod of the vibration damper has a fluid communication passage for the flow of the working fluid in the form of the damping fluid, which is adjusted during the extension movement of the vibration damper when the working piston is shifted in the direction of the second working space for the traction stage or extension movement, and thus the pressure of the working fluid rises in the second working space and the working fluid is depressurised in the direction of the first working space provided for the pressure stage or deflection movement, attenuated by damping devices.

With the deflection movement of the known shock absorber or vibration damper, the working pressure in the first working space rises in the upwards direction because of the movement of the working piston, and the working fluid is depressurized in the direction of a compensation chamber. Here, the working fluid is guided via adjustable damping devices and, in this way, damping work is performed.

When the known vibration damper is arranged, for example, on the back wheel of a motorcycle in the form of a cross-country sports motorcycle, for example, deflection movements and extension movements are attenuated by the vibration damper.

The speed with which the working piston is moved in the cylinder here depends, among other things, on the surface on which the motorcycle is moved. When the motorcycle is driving over a surface that has pronounced unevenness in the form of waves or recesses, the speed with which the working piston is shifted in the cylinder is substantially greater than when the motorcycle is driving over a surface which has only slight and less pronounced unevenness.

With a high displacement speed of the working piston, if a large amount of damping work is carried out by the pressure stage of a vibration damper, then this ensures a jerky load of the rear wheel, since the high damping work counteracts a quick displacement of the working piston, and the rear wheel thus cannot follow the unevenness of the driving lane.

To avoid this problem, it is already known to provide a vibration damper with a first adjustment device for adjusting the pressure stage damping, which has two valve devices that are adjustable for changing throughflow openings for the pressure stage, which can be set independently of one another. By this it is achieved that, with a high displacement speed of the working piston, the valve device can be shifted from the first working space in the direction of the compensation chamber for the displacement of the working fluid with high flow speed and, with lower displacement speeds of the working piston, the working fluid can be shifted in the direction of the compensation chamber with lower flow speeds. A high displacement speed of the working piston ensures a sudden pressure increase in the first working space, while a lower displacement speed of the working piston ensures a slower pressure increase in the first working space, which also does not increase so greatly that the valve device opens in the direction of the compensation chamber for the high flow valve of working fluid. This is because the lower flow valve of working fluid can be depressurized via the valve device for the low flow valve of working fluid in the direction of the compensation chamber.

The known vibration damper also has a second adjustment device for setting the traction stage damping of the extension movement, with which a setting rod shiftably arranged in the axial passage of the piston rod can be displaced for changing a throughflow opening of a valve device for the traction stage. This way, the throughflow opening can be enlarged or made smaller, whereby the damping work is enlarged or made smaller.

Although in practice the above-described known vibration damper has already proved to be most successful, it nevertheless has potential for improvements, because, with the extension movement, the displacement speed of the working piston is also subject to strong deviations depending on the surface structure of the driving track on which the vehicle equipped with the known vibration damper in the form of a motorcycle, for example, is moved.

SUMMARY OF THE INVENTION

A vibration damper is provided having a cylinder formed to receive damping fluid and a working piston axially moveable therein, which is arranged in a guided manner on a piston rod formed with an axial passage and divides the inner space of the cylinder into a first and a second working space, and the vibration damper has a fluid communication passage axially passing through at least sectionally for a fluid flow at least from the second working space to the first working space, and has a first adjustment device for adjusting the pressure stage damping and a second adjustment device for adjusting the traction stage damping, and the first adjustment device has two valve devices that can be adjusted to change throughflow openings for the pressure stage, and the second adjustment device has a setting rod shiftably arranged in the axial passage of the piston rod for changing a first throughflow opening of a third valve device for the traction stage, wherein the second adjustment device has a fourth valve device that can be set separately to the third valve device having an adjustment needle, which is provided to change a second throughflow opening for the traction stage.

BRIEF DESCRIPTION OF THE SEVERAL VIEWS OF THE DRAWING

The invention is illustrated in more detail below by means of the drawings. Here are shown.

DETAILED DESCRIPTION OF THE INVENTION

Figure 1:
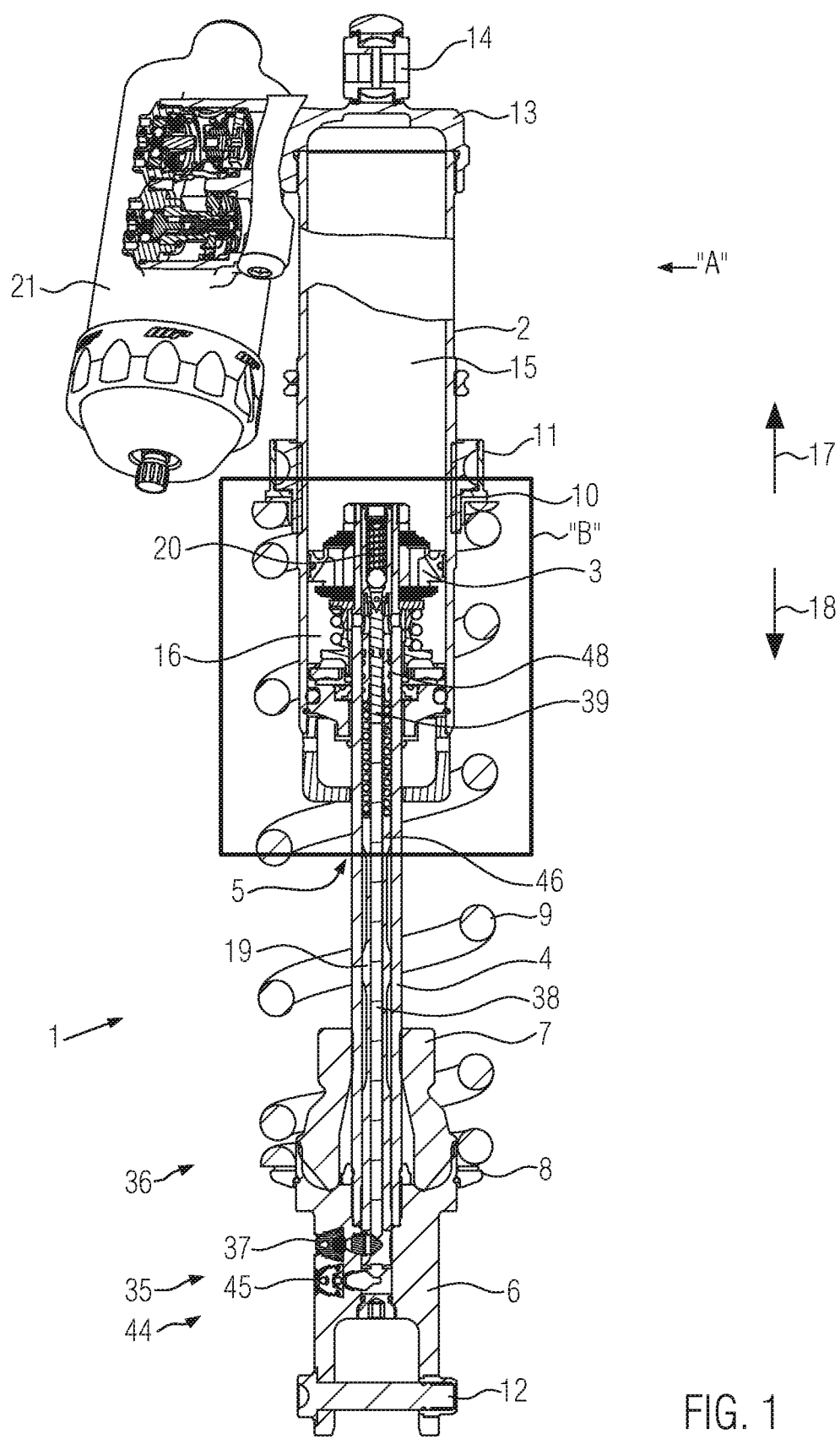
FIG. 1 is a partial longitudinal sectional depiction of an embodiment of a vibration damper according to the present invention.

An object underlying the present invention to avoid the problems described hereinabove is to develop a vibration damper with improved response qualities on different driving track surfaces. The present invention creates a vibration damper having a cylinder formed to receive damping fluid and a working piston axially moveable therein, which is arranged in a guiding manner on a piston rod formed with an axial passage and divides the inner space of the cylinder into a first and a second working space. The vibration damper has a fluid communication passage axially passing through the piston rod at least sectionally for a fluid flow at least from the second working space to the first working space, and a first adjustment device for setting the pressure stage damping and a second adjustment device for setting the traction stage damping. The first adjustment device has two valve devices that can be set to change throughflow openings for the pressure stage, and the second adjustment device has a setting rod shiftably arranged in the axial passage of the piston rod to change a first throughflow opening of a third valve device for the traction stage, wherein the second adjustment device has a fourth valve device that can be adjusted separately to the third valve device having an adjustment needle, which is provided to change a second throughflow opening for the traction stage.

The invention thus creates a vibration damper which has an adjustment device for the traction stage damping, and this adjustment device has two throughflow openings that can be set independently of each other for the flow of the working fluid with the extension movement of the vibration damper. The possibility is thus created for taking different displacement speeds of the working piston into account during the extension movement. If there is a low displacement speed of the working piston, this leads to a pressure increase in the second working space with low speed, and the working fluid can be depressurised by the first throughflow opening of the third valve device for the traction stage in the direction of the first working space. On the other hand, if this results in a high displacing speed of the working piston during the extension movement of the vibration damper, which takes place, for example, when driving the vehicle over ground waves with high amplitude—because the vehicle wheel attenuated by the vibration damper tries to follow the ground waves—then the high damping work with the throughflow of the working fluid through the first throughflow opening of the third valve device leads to the vehicle wheel being unable to follow the ground waves. The wheel thus loses contact with the driving track surface and is unable to transfer any propulsion force without such ground contact.

Here, the invention creates corrective action. The main spring provided in the vibration damper (or separately therefrom) generates, in the observed moment, in which the motorcycle does not have any contact with the ground, a high return force in the direction of the extension movement, which is not counteracted by any (or only by a small amount) of counter force in the form of vertical wheel force. This thus results in a high displacement speed of the working piston with a quick pressure build-up in the second working space. The quick pressure build-up leading to high pressure in the second working space opens the second throughflow opening for the traction stage of the fourth valve device that can be adjusted separately. The opening properties of this second throughflow opening can be changed via the adjustment needle of the fourth valve device, without it being necessary to have to undertake internal interventions on the present vibration damper, i.e., having to undertake an exchange of spring disc packets, for example, for the traction stage, as is the case with known vibration dampers.

In this way, the user of this vibration damper can adapt or change the responding qualities of the vibration damper as desired to high displacement speeds of the working piston, via the adjustable fourth valve device, by means of the adjusting needle. This achieves not only an improvement of the driving comfort, but also that the time periods in which the vehicle wheel does not have any contact with the ground transferring propulsion force are shortened. Thus, for example, when driving over ground waves or ground unevenness in an observed time interval, the phases without the transfer of propulsion force are shortened. An advantage is achieved since such time phases cannot also be used without the transfer of propulsion force for accelerating the vehicle, and, with time phases without ground contact, this also does not result in maintaining control via the vehicle, which is utilised via the contact of the vehicle wheel with the driving surface.

According to an aspect of the invention, the adjustment needle is formed for the axial displacement, and the axial displacement changeably releases the second throughflow opening for damping fluid from the second working space to the first working space depending on the amount of the axial displacement of the adjustment needle. Thus, a configuration is created, according to which the second throughflow opening can be completely closed, can be completely opened or can also be partially opened. The responding qualities of the vibration damper according to the invention can be adapted in the case of extension via the amount of the opening of the second throughflow opening and a change of the amount of the opening of the second throughflow opening, i.e., the responding qualities are correspondingly adapted to the choice of the user during the rebound movement.

According to another aspect of the invention, the adjustment needle has a difference surface supplied by the pressure of the damping fluid in the second working space in such a way that the pressure supplies the adjustment needle in the opening direction of the second throughflow opening.

Thus, it is achieved that a force component is generated on the adjustment needle via the pressure supply of the difference surface, such that this force component leads to a displacement movement of the adjustment needle. This displacement movement further releases the second throughflow opening, and thus the damping work performed by the second throughflow opening when the working fluid is flowing through decreases, and the return force exerted by the main spring leads to a quick extension movement of the vehicle wheel, and thus the vehicle wheel quickly regains contact with the driving surface.

According to another aspect of the invention, the adjustment needle is a sleeve body formed to be a hollow cylinder, said sleeve body having an inner recess for receiving the setting rod or an adjustment needle, and is in contact with a spring device supplying the sleeve body in the closed position of the second throughflow opening.

Thus, it is achieved that a compact design of the vibration damper according to the invention is achieved by the possibility of integrating the setting rod into the sleeve body, and a pretensioned position of the sleeve body is achieved via the supply of the sleeve body with the spring device in the closed position of the second throughflow opening, which acts against an opening movement of the sleeve body; and an opening or further opening of the second throughflow opening is guided past only after exceeding a predetermined working pressure in the second working space.

The responding qualities of the vibration damper accordingly can be changed via the supply of the sleeve body with a pretension force that can be adjusted via the spring device, without it being necessary to have to open the vibration damper, for example, for installing a modified spring disc packet. A lower pretension force leads, for example, to an opening of the second throughflow opening in the event of a lower pressure level in the second working space, and thus already in the event of a slower displacement speed of the working piston, while a higher pretension force causes the opening or further opening of the second throughflow opening only in the event of a higher displacement speed of the working piston. The degree of the opening of the second throughflow opening and/or the start of the opening of the second throughflow opening thus can be freely adjusted.

According to another aspect of the invention, the adjustment needle is arranged on a region of the axial passage of the piston rod, said region being provided with a free-flow bushing, and, in each case, a sealing device is arranged on the outer periphery and on the inner periphery of the adjustment needle.

By admitting the adjustment needle into the free-flow bushing, such that the adjustment needle can be displaced along the inner peripheral surface of the free-flow bushing, it can be achieved that the adjustment needle reacts to a pressure increase in the second working space via the pressure level preadjusted by means of the pretension of the spring device with a displacement movement in the direction of the opening of the second throughflow opening. This is accomplished without a high breakaway torque having to be overcome for the movement of the adjustment needle.

The arrangement of the respective sealing device on the inner periphery and on the outer periphery of the adjustment needle ensures that the prevailing working pressure of the damping fluid in the second working space cannot escape in an uncontrolled manner along the piston rod of the vibration damper.

According to another aspect of the invention, the adjustment needle is provided with a passage for damping fluid running from the outer periphery in the direction of the inner periphery. In this way, it is achieved that the damping fluid in the second working space can reach the inner space of the adjustment needle via the passage and, from there, can flow via the fluid communication passage in the direction of the first working space, such that a fluid flow and thus the performance of damping work is possible by means of this fluid flow.

According to another aspect of the invention, the vibration damper has a setting rod arranged in the axial passage of the piston rod and formed to be a hollow cylinder. Said piston rod is formed axially displaceably by means of a setting element that can be brought into active engagement with the setting rod to change the second throughflow opening for the traction stage. In other words, this means that the setting rod can be axially displaced via the setting element accessible from the outside on the vibration damper, said setting rod being able to pretension and/or displace the adjustment needle, for example via the spring device mentioned above. The degree of opening of the second throughflow opening accordingly can be changed via the setting element arranged outwardly on the vibration damper. In turn, this ensures that the responding qualities of the vibration damper can be set or changed to different displacement speeds of the working piston during the rebound movement.

According to another aspect of the invention, the second adjustment device has a cylindrical adjustment needle that can be axially displaced relative to the piston rod, the axial displacement of said adjustment needle changeably releasing the first throughflow opening for damping fluid from the second working space to the first working space, depending on the amount of axial displacement of the adjustment needle. Thus, the degree of the opening of the first throughflow opening can be changed via an axial displacement for the entrance of working fluid from the second working space into the first working space, and the damping work performed when the working fluid is passing through the first throughflow opening can be influenced. With the change of the damping work, the responding qualities of the vibration damper can be influenced to a low displacement speed of the working piston during the extension movement.

According to yet another aspect of the invention, the adjustment needle provided for changing the first throughflow opening is formed to be able to be brought into abutment with the setting rod mentioned previously, and the first throughflow opening is changeably releasable by means of an axial displacement of the setting rod. Accordingly, the adjustment needle can be axially displaced via the axial displacement of the setting rod, and the degree of the opening of the first throughflow opening can be changed.

According to another aspect of the invention, the adjustment needle provided to change the first throughflow opening defines a V-shaped recess on a front-side end section, and the front-side end section extends into a recess of a tubular sleeve body, said recess being formed complementarily to the configuration of the end section, and the end section abuts on the inner wall of the recess. The V-shaped configuration of the end section of the adjustment needle ensures that the region of the V-shaped recess or groove released by the sleeve body can be changed via an axial displacement of the adjustment needle, via an axial displacement of the end section, which is found to be arranged in the recess of the sleeve body, and thus the passage surface released for the passage of damping fluid via the V-shaped recess can be changed. The end section of the adjustment needle remains along the displacement path of the adjustment needle in the recess of the tubular sleeve body, such that an axial guiding of the adjustment needle is achieved by the end section. This advantageously does not result in a vibration increase of the adjustment needle, even in the event of high flow speeds of the damping fluid passing the adjustment needle and turbulent flow behaviour. Thus a movement of the adjustment needle, otherwise taking place as a result of any vibration increase of the adjustment needle, is omitted in the radial direction inside the axial passage of the sleeve body receiving the adjustment needle, said sleeve body being provided for changing the second throughflow opening of the second adjustment device, and thus a seal otherwise taking place as a result of such movements is also omitted.

According to another aspect of the invention, the vibration damper has a setting element, which can be brought into active engagement with the setting rod for changing the first throughflow opening for the traction stage. It thus is made possible that the degree of the opening of the first throughflow opening can be changed for the extension movement of the vibration damper by means of the setting element accessible from the outside.

According to another aspect of the invention, the adjustment needle is arranged relative to the sleeve body of the second throughflow opening in such a way that an axial displacement of the adjustment needle releases at least one partial region of the V-shaped recess for the passage of damping fluid from the second working space to the first working space.

Also, according to a feature of the invention, the two valve devices of the first adjustment device are formed to change a first lower mass flow of damping fluid and a second higher mass flow of damping fluid from the first working space in the direction of a compensation space for the reception of damping fluid. This configuration ensures that damping fluid in the form of a first lower mass flow can flow in the direction of the compensation space, depending on the pressure in the first working space in the event of a displacement movement of the working piston with a deflection movement with low displacement speed. This mass flow can be adjusted via the valve device, and a second higher mass flow can flow into the compensation space in the event of a higher displacement speed of the working piston, and this mass flow can also be adjusted via the valve device. Thus, a valve device for a low mass flow and a valve device for a high mass flow can also be created in the event of a deflection movement of the working piston.

According to yet another aspect of the invention, the valve device has a valve needle that can be displaced in relation to a bore provided for the passage of damping fluid in the form of a lower mass flow for changing the first mass flow, and the valve device has a spring disc arrangement that can be supplied by a spring device with changeable pretension for changing the second mass flow. Such a configuration ensures that the opening can be enlarged or made smaller via the displaceable valve needle for the passage of the lower mass flow, and a spring disc arrangement is changeably supplied via the valve device for changing the second mass flow by means of a spring device; said spring disc arrangement having to be opened by the pressure in the first working space for the passage of the working fluid to the compensation space.

According to another aspect of the invention, the working piston is formed with at least one passage for the passing of the damping fluid between the first and second working space, as well as being provided with valve devices, in particular in the form of spring discs for selectively releasing the passage of the damping fluid. This configuration ensures that damping fluid can flow between the two working spaces, both with the deflection movement and with the extension movement, for the performance of damping work by means of the working piston.

Finally, according to an aspect of the invention, the vibration damper has a gas spring for the pressure supply of the damping fluid, such that a predetermined system pressure can be maintained in the vibration damper by the gas spring provided, for example, in the compensation space, and the formation of cavitation can be prevented.

Attention may be turned to the drawing figures. The vibration damper 1 has a cylinder 2 formed for receiving damping fluid and a working piston 3 arranged axially moveably therein. Here, the working piston 3 is fixed on a piston rod 4, which extends via a passage 5, which is sealed with a sealing device (not depicted in more detail), out of the inner space of the cylinder 2. Here, the piston rod 4 extends in the direction of a receiver 6, on which the piston rod 4 is axially fixedly fastened and indeed via damping component 7.

The receiver 6 has a collar 8, on which a main spring 9 is supported, which is supported on its opposite end region on a receiver 11 provided with a collar 10. The main spring 9 enables a spring movement of a rear wheel of a motorcycle supported on a receiver 12 but not depicted in more detail, wherein this may be a cross-country sport motorcycle.

Another receiver 13 is arranged on the end region of the vibration damper 1 opposite the first receiver 6, said receiver 5 engaging across the cylinder 2 and having a further receiver 14, which can be supported on a frame component of the motorcycle (not depicted in more detail).

The working piston 3 separates a first working space 15 from a second working space 16, which is filled with damping fluid as the working medium, just like the damping medium. The first working space 15 serves as a pressure stage, which thus serves for the pressure build-up inside the working space 15 in the event of a deflection movement of the vibration damper 1 in the direction of the arrow 17, while the second working space 16 serves as the traction stage for the pressure build-up in the event of an extension movement of the vibration damper 1 in the direction of arrow 18.

The piston rod 4 has an axial passage 19, is thus formed to be internally hollow along its longitudinal extension, and has a fluid communication passage 20 through which damping fluid can emerge from the second working space 16 in the direction of the first working space 15. Moreover, the vibration damper 1 has a compensation container 21, which has an inner space 22, in which a compensation chamber 23 is found to be arranged, and is provided inside a gas spring 24 arranged on the lower end region of the compensation container 21.

Figure 2:
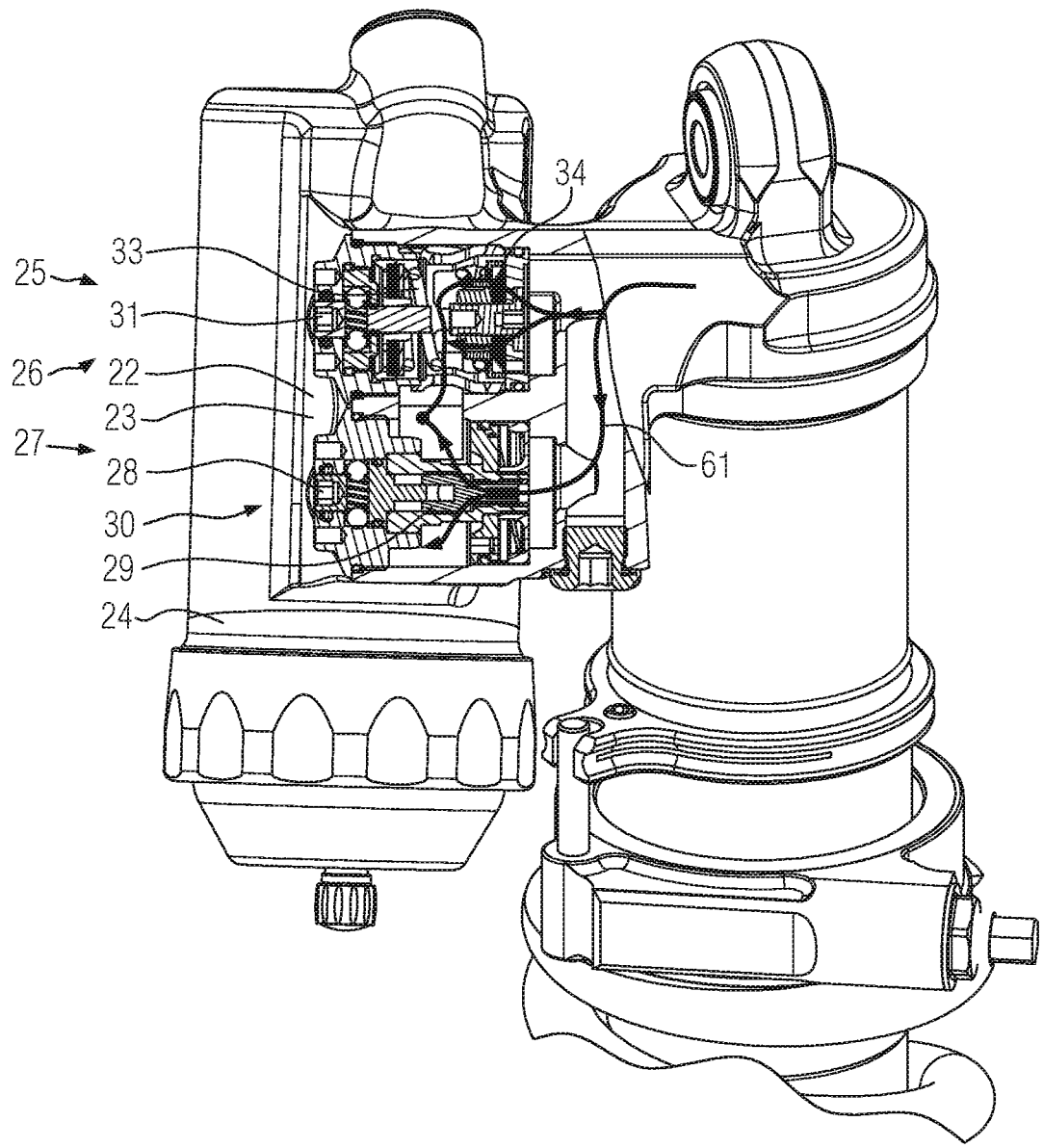
FIG. 2 is an enlarged depiction of the cut-out "A" according to FIG. 1 of the drawings.

As is seen in more detail in FIG. 2, the vibration damper 1 has a first adjustment device 25 for adjusting the pressure stage damping with two valve devices 26 and 27, which are accessible from the outside for the user of the vibration damper 1. For this purpose, the valve device 27 has a displaceable valve needle 28, the spacing of which in relation to a bore 29 can be changed via an external setting element 30 for changing the cross-sectional surface that can be flowed through by the working fluid; the responding qualities of the vibration damper can be adjusted in the pressure stage in the event of low pressure build-up and a thus an accompanying low displacement speed of the working piston 3.

In a similar manner, the first valve device 25 has the second valve device 26 already mentioned above, with which the responding qualities of the vibration damper can be adjusted in the event of a deflection movement with high displacement speed of the working piston 3. To do so, the valve device 26 has a setting element 31 accessible from the outside, with which a spring device 33 can be supplied to be adjustably changeable, which, in turn, supplies a spring disc packet 34, which is supplied by the working pressure of the damping fluid in the first working space 15.

If a low displacement speed is adjusted on the working piston 3, then this leads to a slow increase of pressure in the first working space 15 and a low mass flow of damping fluid through the valve device 27, while, in the event of a displacement of the working piston 3 with high displacement speed, this results in a sudden increase of the working pressure in the pressure stage, i.e. the first working space 15; a high mass flow of damping fluid is adjusted, which supplies the spring disc packet 34, and thus a flow track for damping fluid is released in the direction of the compensation chamber 23. In this way, two throughflow openings for working fluid can be adjusted with the two valve devices 26 and 27 independently of each other, and thus the damping properties of the vibration damper 1 can also be adjusted independently of each other during the deflection movement or compression movement, corresponding to the request of the user in the event of the low displacement speed of the working piston 3 and in the event of the high displacement speed of the working piston 3.

The vibration damper 1 has a second adjustment device 35, which is provided for adjusting the responding qualities of the vibration damper 1 during the extension movement.

Figure 3:
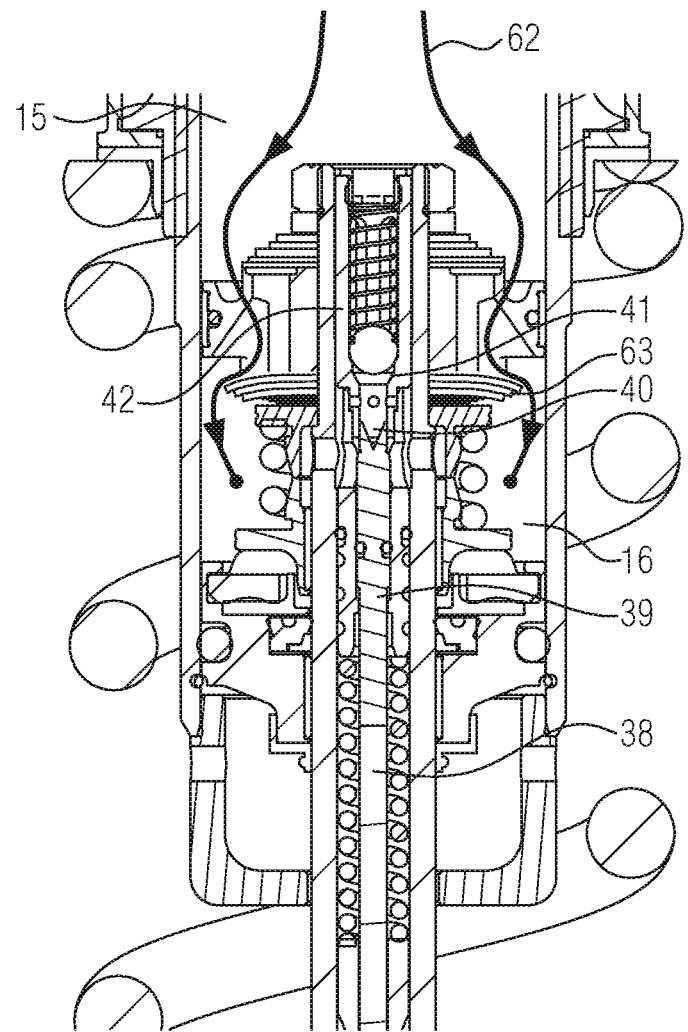
FIG. 3 is an enlarged depiction of the cut-out "B" according to FIG. 1 of the drawings.

The second adjustment device 35 has a third valve device 36, which has a setting element 37 and a setting rod 38 visible in more detail in FIG. 3 of the drawings. The setting rod 38 can be axially shifted in the axial passage 19 of the piston rod 4 via the setting element 37 accessible to the user from the outside, and indeed by means of a rotation movement or screwing moving on the setting element 37.

This actuation of the setting element 37 leads to the axial displacement of the setting rod 38, which is formed on its upper end region as a V-shaped adjustment needle 39, i.e., is thus formed integrally with the adjustment needle 39. In converting to the integral formation, the setting rod 38 can also be formed separately from the V-shaped adjustment needle 39, such that the setting rod 38 can be brought into abutment with the cylindrical V-shaped adjustment needle 39 in such an embodiment in relation to its axial displacement.

As seen in FIG. 3 of the drawings, the small spacing between the V-shaped end section 40 and the end section 41 of a tubular sleeve body 42 can be adjusted via the axial displacement of the adjustment needle 39 and, in this manner, the first throughflow opening 43 of the second adjustment device 35 can be adjusted. The second adjustment device 35 has a fourth valve device 44 which can be adjusted separately from the third valve device 36, said fourth valve device serving to adjust the responding qualities of the vibration damper 1 during the extension movement with high displacement speed of the working piston 3.

Figure 7:
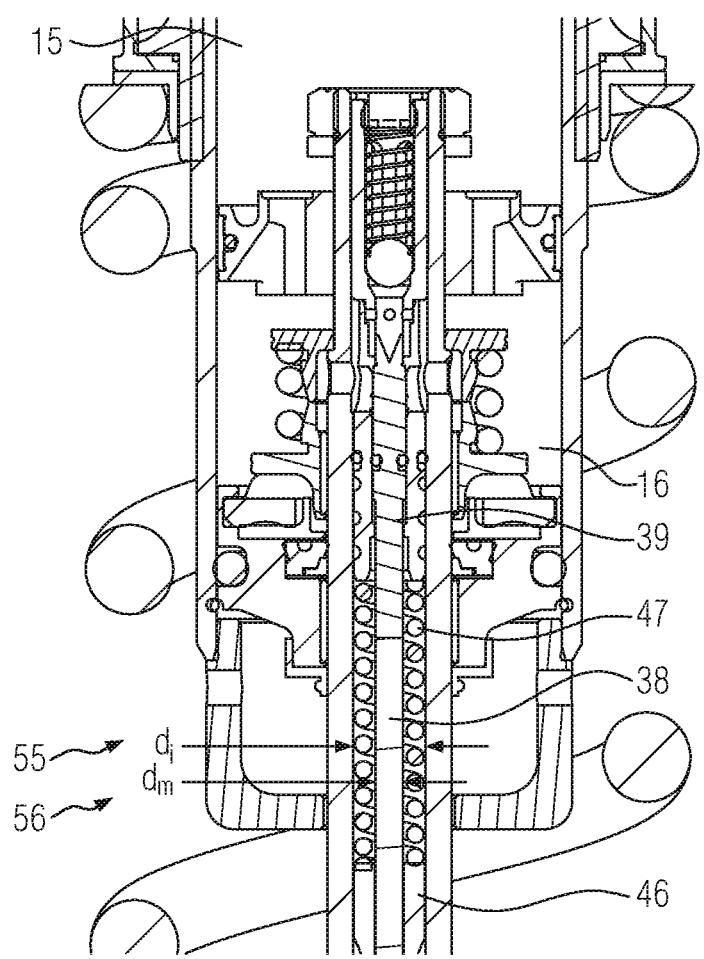
FIG. 7 is a sectional depiction of a cut-out similar to cut-out "B" according to FIG. 1, for illustrating the difference surface.

The fourth valve device 44 has a setting element 45 that is accessible for the user from the outside, which can axially displace a hollow-cylindrical setting rod 46 visible in more detail in FIG. 1 and FIG. 7 of the drawings, and that is inside the axial passage 19 of the piston rod 4. As visible in more detail in FIG. 7 of the drawings, there is a spring device in the form of a screw pressure spring 47 arranged on the upper end region of the sleeve-shaped setting rod 46, said screw pressure spring being able to be supplied by means of the axial displacement of the setting rod 46. The spring device 47 abuts on the adjustment needle 48 (visible in more detail in FIG. 1 and FIG. 7 of the drawings) on its end region opposite the setting rod 46.

Figure 10:
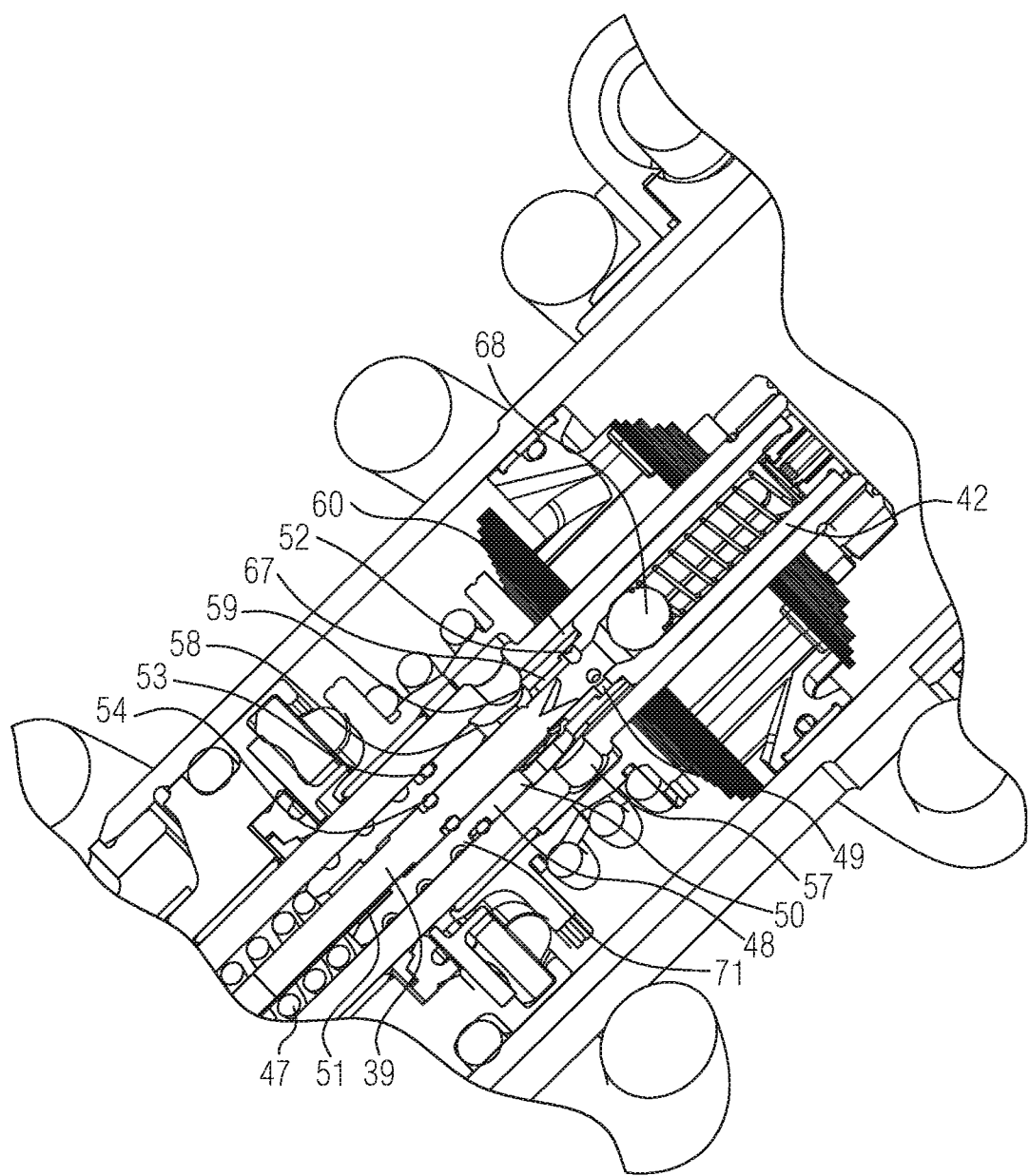
FIG. 10 is a perspective enlarged depiction of the cut-out "B" according to FIG. 1 of the drawings.

With the adjustment needle 48 provided on a free-flow bushing 71 of the axial passage 19 of the piston rod 4, the second throughflow opening 49 visible in FIG. 10 of the drawings can be set for the traction stage, i.e., can be enlarged or made smaller. The adjustment needle 48 is a tubular sleeve body 50, which receives the V-shaped adjustment needle 39 and that is in an inner recess 51 of the sleeve body 50.

As is readily visible in FIG. 10 of the drawings, the sleeve body 42 has four transverse bores 52 on the lower end section 60, which form the second throughflow opening 49. The transverse bores 52 can be closed, partially released or completely released via an axial displacement of the sleeve body 50. With the change of the surfaces that can be flowed through of the second throughflow opening 49, the responding qualities of the vibration damper can be freely adjusted to an extension movement in the event of high displacement speed of the working piston 3. For this purpose, the setting rod 46 can in particular be axially shifted via an actuation of the setting element 45, with said setting rod, for its part, supplying the spring device 47, on which the adjustment needle 48 abuts.

FIG. 10 of the drawings shows that the adjustment needle 48 has sealing devices in the form of O-rings 53, 54, both on the outer periphery and on the inner periphery, which ensure that the damping fluid in the second working space 16 does not escape through the axial passage 19 of the piston rod 4. They also ensure that, in the event of pressure build-up in the second working space 16, a difference surface 55 formed on the adjustment needle 48 ensures that the adjustment needle 48 is supplied in the direction of an opening movement of the second throughflow opening 49.

As is visible in FIG. 7 of the drawings, the difference surface 55 is formed by the surface 56 which emerges from the difference between the inner diameter of the axial passage 19 of the piston rod 4 and the outer diameter of the setting rod 38.

The working pressure formed in the second working space 16 continues in the direction of the sleeve body 50 via the transverse bore 57, which is visible in FIG. 10 of the drawings, and, there, supplies the resulting lower annular surface 58 and the upper resulting annular surface 59, which is, however, because of the tapering formation of the sleeve body 50, smaller in the region of the end section allocated to the sleeve body 50 than the lower resulting annular surface 58. This leads to the sleeve body 50 being supplied in the direction of the opening movement of the second throughflow opening 49.

Thus, the opening properties of the fourth valve device 44 can be influenced by the rotation actuation of the setting element 45, and a corresponding pretension of the spring device 47 and a corresponding selection of the stiffness of the spring device 47—and thus the responding qualities of the vibration damper 1 in the event of an extension movement of the vibration damper 1.

While FIG. 2 shows a flow path 61 of the working fluid during a deflection movement of the vibration damper 1, FIG. 3 of the drawings shows a flow path 62 during the deflection movement of the first working space 15 in the direction of the second working space 16. A high-pressure level adjusting in the first working space 15 with a deflection movement of the vibration damper 1 leads to an opening movement of the spring disc packets 63 and thus to the formation of the current path 62.

Figure 4:
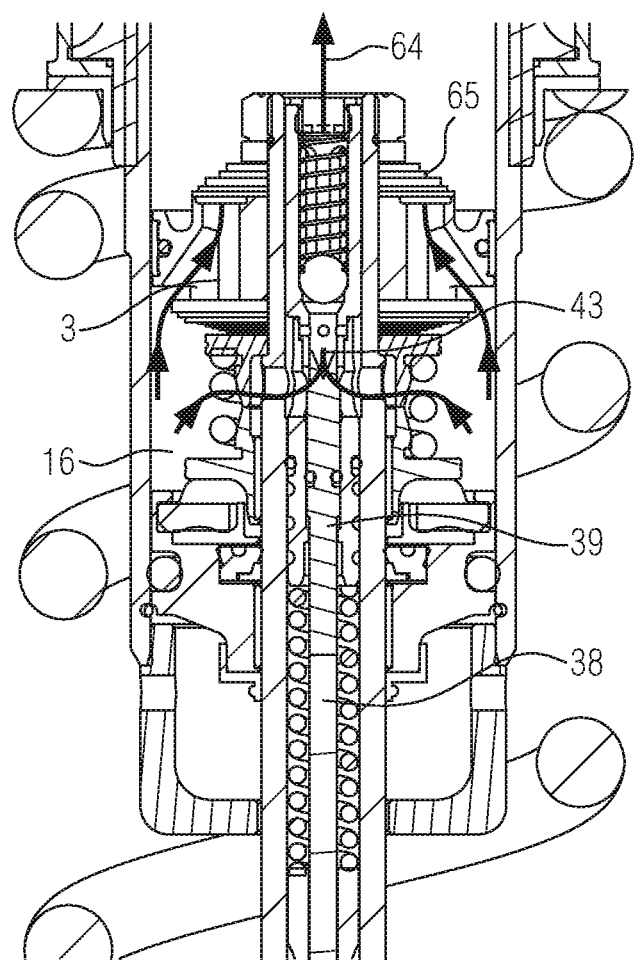
FIG. 4 is a depiction similar to FIG. 3, which shows the flow of damping fluid from the second working space into the first working space with low displacement speed of the working piston.
Figure 9:
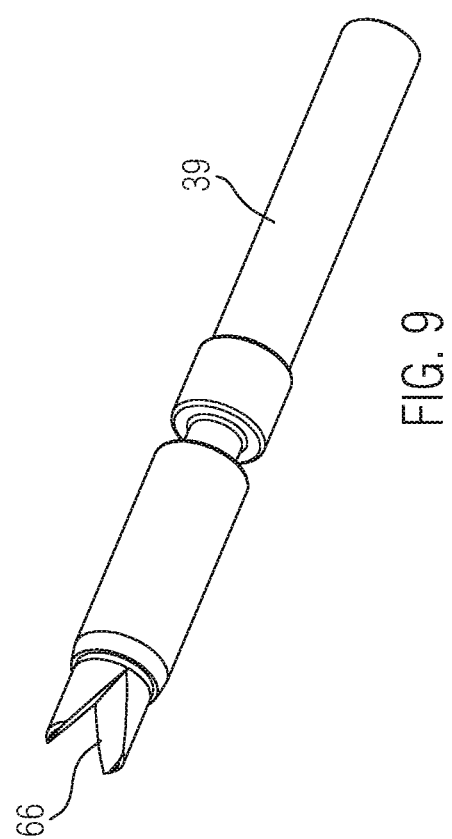
FIG. 9 is a perspective depiction for illustrating an adjustment needle for changing the first throughflow opening.

FIG. 4 of the drawings shows a flow path 64, which is adjusted in the event of an extension movement of the vibration damper 1 with low displacement speed of the working piston 3. The higher pressure adjusted with the extension movement in the second working space 16 is still not sufficiently large to be able to open the spring disc packet 65; yet, there is a fluid movement of damping fluid via the first throughflow opening 43, because of the increasing pressure, because the V-shaped recess 66 of the adjusting needle 39, visible in FIG. 9, protrudes from the lower end section 67 of the sleeve body 42. Thus, a flow of damping fluid is possible, as the pressure is sufficient to actuate the ball valve 68 in the passage direction.

Figure 5:
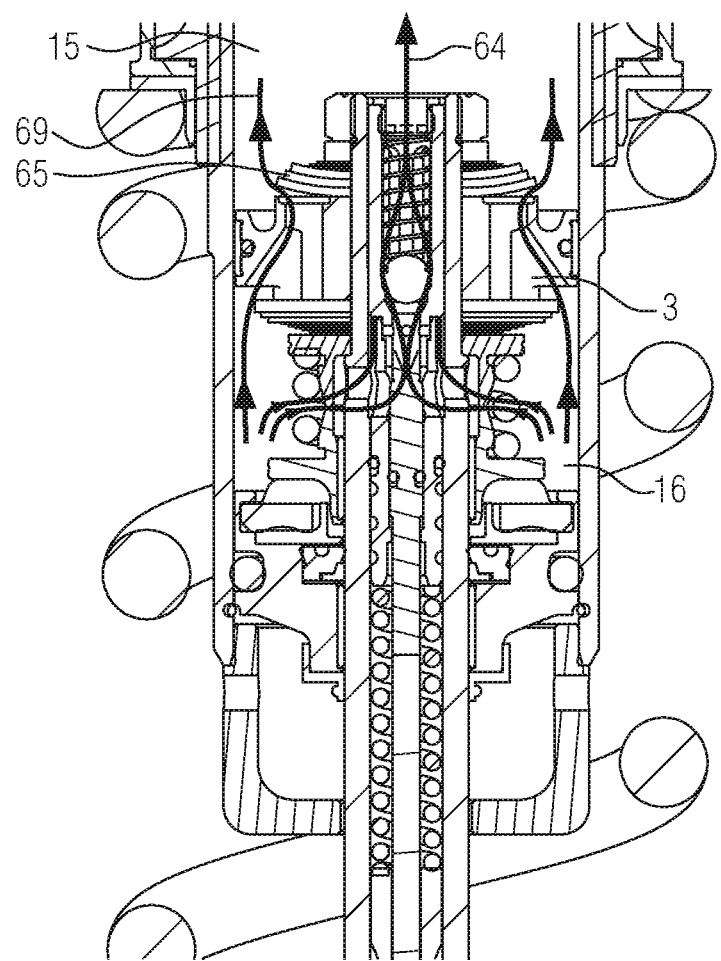
FIG. 5 shows a depiction similar to FIG. 4, which shows the flow course in a transition situation, during which a flow through a first throughflow opening and flow track released by the spring disc packet is possible.

If the pressure in the second working space 16 further increases because of an increase of the displacement speed of the working piston 3, then this leads to a transition situation depicted in FIG. 5. A flow path 64 is adjusted, which is illustrated in FIG. 4, and, in addition, the pressure is sufficient in order to actuate the spring disc packet 65 to the opening movement, such that a further flow of working fluid is adjusted according to the flow path 69 from the second working space 16 in the direction of the first working space 15.

Figure 6:
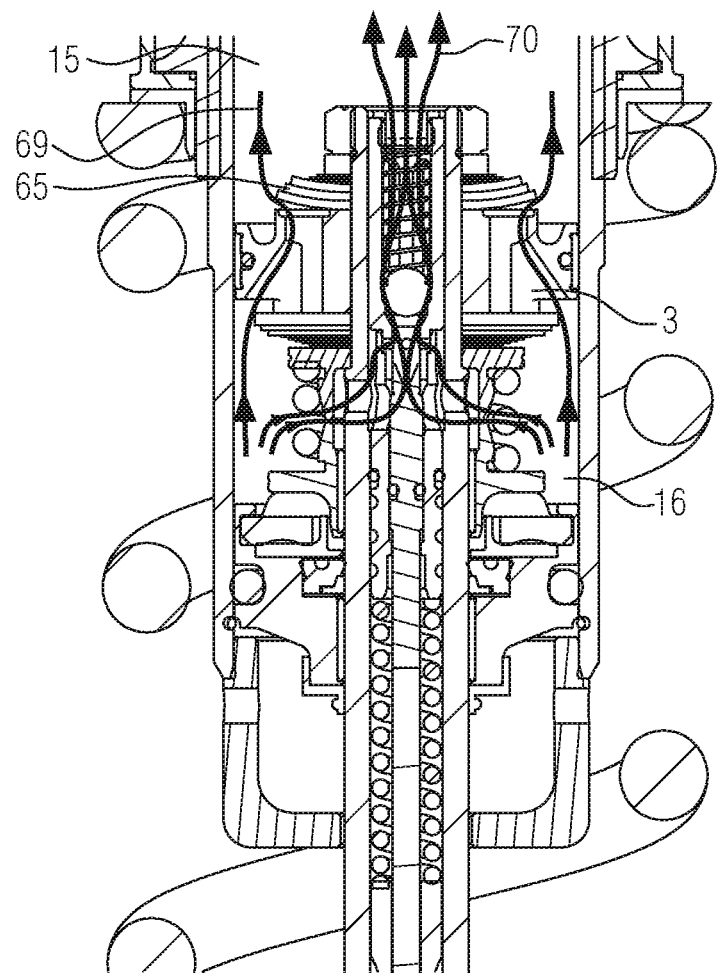
FIG. 6 is a depiction similar to FIG. 5, in which a fluid flow through the second throughflow opening is also possible.

When the working pressure in the second working space 16 increases further with a further increase of the displacement speed of the working piston 3, then this leads to the formation of a further flow path 70 of working fluid, as is visible in FIG. 6. In this case, the working pressure increases in particular in the second working space 16 because of a high displacement speed of the working piston 3 to such an extent that the adjustment needle (visible in more detail in FIG. 10) is supplied in the direction of the opening movement of the second throughflow opening 49; the second throughflow opening is released and an additional mass flow of damping fluid or working fluid is adjusted from the second working space 16 in the direction of the first working space 15, which is symbolized by the flow path 70.

Figure 8:
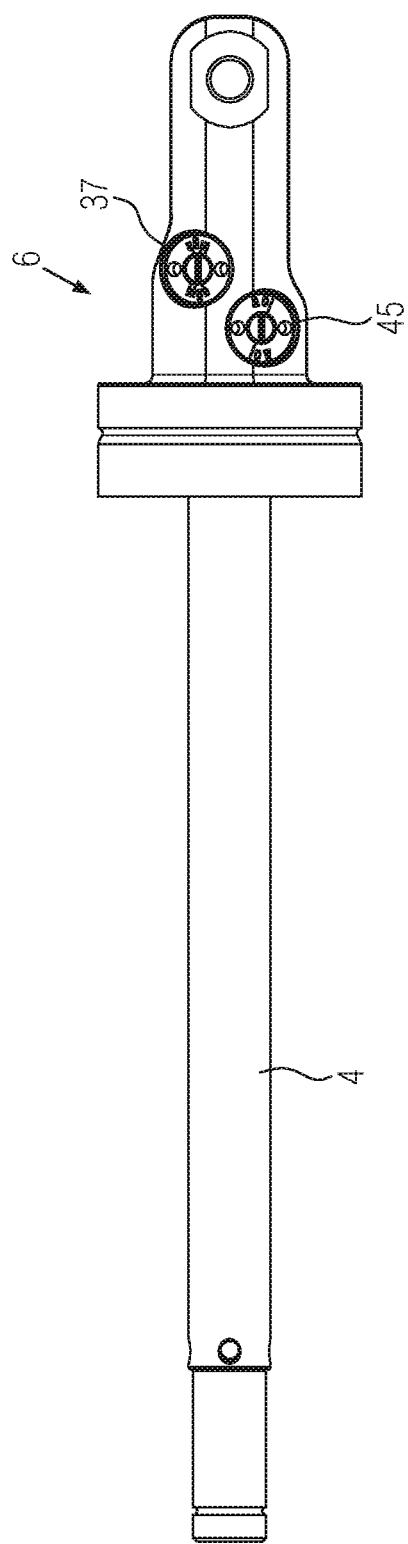
FIG. 8 is a depiction of the piston rod arranged on a lower damper receiver.

FIG. 8 of the drawings shows the piston rod 4 in a schematic depiction with the setting element 37 and 45 arranged on the lower receiver 6. FIG. 8 makes it clear that the user can adjust the responding qualities of the vibration damper 1 via a rotation actuation of the two setting elements with the extension movement separately for the two cases of a high displacement speed of the working piston and a low displacement speed of the working piston. In this way, the user can achieve a change of the responding qualities of the vibration damper corresponding to his demand or request with the extension movement.

With the formation of the vibration damper according to the invention, it is thus made possible to adjust the responding qualities of the vibration damper with the extension movement both with a low displacement speed of the working piston and with a high displacement speed of the working piston independently of each other, such that it is possible for the user to sensitively adjust the responding qualities of the vibration damper not only in the pressure stage, i.e. with the deflection movement, but also to sensitively adjust the responding qualities of the vibration damper with the extension movement without it being necessary to undertake reconstruction measures on the vibration damper, such as an exchange of the spring disc packet for the fluid flow, for example, between the expansion chamber, i.e. the working space and the pressure chamber, i.e. the first working space.

In terms of the features of the invention not explained individually in more detail above, reference is explicitly made to the claims and the drawings.

LIST OF REFERENCE NUMERALS

1. Vibration damper
2. Cylinder
3. Working piston
4. Piston rod
5. Passage
6. Receiver
7. Damping component
8. Collar
9. Main spring
10. Collar
11. Receiver
12. Receiver
13. Receiver
14. Receiver
15. First working space
16. Second working space
17. Arrow 18. Arrow
19. Axial passage
20. Fluid communication passage
21. Compensation container
22. Inner space
23. Compensation chamber
24. Gas spring
25. First adjustment device
26. Valve device
27. Valve device
28. Valve needle
29. Bore
30. Setting element
31. Setting element
32. Spring device
33. Spring device
34. Spring disc packet
35. Second adjustment device
36. Third valve device
37. Setting element
38. Setting rod
39. V-shaped adjustment needle
40. V-shaped end section
41. End section
42. Sleeve body
43. Firth throughflow opening
44. Fourth valve device
45. Setting element
46. Setting rod
47. Spring device
48. Adjustment needle
49. Second throughflow opening
50. Tubular sleeve body
51. Inner recess
52. Transverse bore
53. O-ring
54. O-ring
55. Difference surface
56. Surface
57. Transverse bore
58. Lower annular surface
59. Upper annular surface
60. End section
61. Flow path
62. Flow path
63. Spring disc packet
64. Flow path
65. Spring disc packet
66. V-shaped recess
67. Lower end section
68. Ball valve
69. Flow path
70. Flow path
71. Free-flow bushing

What is claimed is:

1. A vibration damper having a cylinder formed for receiving damping fluid and having a working piston axially moveable therein, which piston is arranged in a guided manner on a piston rod formed with an axial passage and which divides the inner chamber of the cylinder into a first working space and a second working space, and the vibration damper further comprising:
   a fluid communication passage axially passing through the piston rod for a fluid flow at least from the second working space to the first working space;
   a first adjustment device for setting a pressure stage damping, and comprising first and second valve devices settable to change flowthrough openings for a pressure stage; and
   a second adjustment device for setting a rebound stage damping and comprising an adjustment rod shiftably arranged in the axial passage of the piston rod, for changing a first throughflow opening of a third valve device for the rebound stage;
   wherein the second adjustment device has a fourth valve device, adjustable separately from the third valve device, having an axially displaceable adjustment needle for changing a second throughflow opening for the rebound stage;
   wherein the axial displacement of the adjustment needle changeably releases the second throughflow opening for damping fluid from the second working space to the first working space depending on an amount of axial displacement of the adjustment needle; and
   wherein the adjustment needle has a difference surface receiving a pressure of the damping fluid in the second working space, whereby the pressure moves the adjustment needle in the opening direction of the second throughflow opening.

2. The vibration damper according to claim 1, wherein the adjustment needle comprises a sleeve body formed to be hollow-cylindrical, which body has an inner recess for receiving the adjustment rod or a second adjustment needle, and is in contact with a spring device urging the sleeve body in the closed position of the second throughflow opening.

3. The vibration damper according to claim 1, wherein the adjustment needle is arranged on a region of the axial passage of the piston rod, the region provided with a bushing, and further comprising a sealing device arranged on an inner periphery of the adjustment needle.

4. The vibration damper according to claim 1, wherein the adjustment needle has a passage running from an outer periphery in the direction of the inner periphery of the adjustment needle, for damping fluid.

5. The vibration damper according to claim 1, wherein a first setting rod is arranged in the axial passage of the piston rod and formed to be hollow-cylindrical, the first setting rod being formed to be axially shiftable by means of a setting element actively engageable with the first setting rod for changing the second throughflow opening for the rebound stage.

6. The vibration damper according to claim 1, wherein the second adjustment device has a second adjustment needle axially shiftable relative to the piston rod and formed to be cylindrical, and wherein the axial shifting of the second adjustment needle changeably releases the first throughflow opening for damping fluid from the second working space to the first working space, depending on an amount of axial shifting of the second adjustment needle.

7. The vibration damper according to claim 6, wherein the second adjustment needle is adapted to be brought into abutment with a second setting rod, and the first throughflow opening is changeably releasable by an axial shifting of the second setting rod.

8. The vibration damper according to claim 6, wherein the second adjustment needle defines a V-shaped recess on a front-side end section, and the front-side end section extends into a recess of a tubular sleeve body, the recess formed to be complementary to the configuration of the end section, and the end section abuts on the inner wall of the recess.

9. The vibration damper according to claim 7, further comprising a setting element actively engageable with the second setting rod for changing the first throughflow opening for the rebound stage.

10. The vibration damper according to claim 8, wherein the second adjustment needle is arranged relative to the sleeve body so that an axial shifting of the second adjustment needle releases at least one partial region of the V-shaped recess for passing through the damping fluid from the second working space to the first working space.

11. The vibration damper according to claim 1, wherein the first and second valve devices of the first adjustment device are formed to change a first lower mass flow of the damping fluid and a second higher mass flow of damping fluid from the first working space in the direction of a compensation chamber for receiving damping fluid.

12. The vibration damper according to claim 11, wherein the second valve device has a shiftable valve needle relative to a bore provided for the passage of damping fluid in the form of lower mass flow for changing the first mass flow, and the first valve device has a spring plate arrangement suppliable with a changeable pretension by a spring device for changing the second mass flow.

13. The vibration damper according to claim 1, wherein the working piston defines at least one passage for the passage of damping fluid between the first working space and the second working space and is provided in the form of spring discs for selectively releasing the passage of damping fluid.

14. The vibration damper according to claim 1, further comprising a gas spring for supplying pressure of the damping fluid of the vibration damper.

15. A vibration damper having a cylinder formed for receiving damping fluid and having a working piston axially moveable therein, which piston is arranged in a guided manner on a piston rod formed with an axial passage and which divides the inner chamber of the cylinder into a first working space and a second working space, and the vibration damper further comprising:

a fluid communication passage axially passing through the piston rod for a fluid flow at least from the second working space to the first working space;

a first adjustment device for setting a pressure stage damping, and comprising first and second valve devices settable to change flowthrough openings for a pressure stage; and a second adjustment device for setting a rebound stage damping and comprising an adjustment rod shiftably arranged in the axial passage of the piston rod, for changing a first throughflow opening of a third valve device for the rebound stage;

wherein the second adjustment device has a fourth valve device, adjustable separately from the third valve device, having a first adjustment needle for changing a second throughflow opening for the rebound stage, and further wherein the first adjustment needle comprises a sleeve body formed to be hollow-cylindrical, which body has an inner recess for receiving the adjustment rod or a second adjustment needle, and is in contact with a spring device urging the sleeve body in the closed position of the second throughflow opening.

16. The vibration damper according to claim 15, wherein the first adjustment needle is arranged on a region of the axial passage of the piston rod, the region provided with a bushing, and further comprising a sealing device arranged on an inner periphery of the first adjustment needle.

17. The vibration damper according to claim 16, wherein the first adjustment needle has a passage running from an outer periphery in the direction of the inner periphery of the first adjustment needle, for damping fluid.

18. The vibration damper according to claim 17, wherein a first setting rod is arranged in the axial passage of the piston rod and formed to be hollow-cylindrical, the first setting rod being formed to be axially shiftable by means of a setting element actively engageable with the first setting rod for changing the second throughflow opening for the rebound stage.

* * * * *